(12) United States Patent
Kubota

(10) Patent No.: US 6,721,244 B2
(45) Date of Patent: Apr. 13, 2004

(54) FOCUSING SERVO PULL-IN APPARATUS

(75) Inventor: Masashi Kubota, Tokyo (JP)

(73) Assignee: NEC Corporation, Tokyo (JP)

( * ) Notice: Subject to any disclaimer, the term of this patent is extended or adjusted under 35 U.S.C. 154(b) by 165 days.

(21) Appl. No.: 10/058,417

(22) Filed: Jan. 30, 2002

(65) Prior Publication Data
US 2002/0101800 A1 Aug. 1, 2002

(30) Foreign Application Priority Data
Jan. 30, 2001 (JP) ........................................ 2001-021733

(51) Int. Cl.⁷ ................................................ G11B 7/00
(52) U.S. Cl. .............................. 369/44.27; 369/44.28; 369/112.01
(58) Field of Search ........................... 369/44.27, 44.28, 369/44.23, 44.25, 44.42, 53.28, 112.01, 112.08, 112.23; 250/201.5

(56) References Cited

U.S. PATENT DOCUMENTS

| | | | | |
|---|---|---|---|---|
| 6,002,656 A | * | 12/1999 | Miyagawa et al. | 369/44.28 |
| 6,381,201 B1 | * | 4/2002 | Shihara et al. | 369/32.01 |
| 6,584,048 B1 | * | 6/2003 | Tateishi et al. | 369/44.28 |

FOREIGN PATENT DOCUMENTS

| | | |
|---|---|---|
| JP | 60-28034 | 2/1985 |
| JP | 61-48134 | 3/1986 |
| JP | 63-129525 | 6/1988 |
| JP | 63-144425 | 6/1988 |
| JP | 63-155425 | 6/1988 |
| JP | 1-96829 | 4/1989 |
| JP | 3-12032 | 1/1991 |
| JP | 3-37828 | 2/1991 |
| JP | 3-16691 | 3/1991 |
| JP | 3-225628 | 10/1991 |
| JP | 4-186532 | 7/1992 |
| JP | 4-70697 | 11/1992 |
| JP | 5-166195 | 7/1993 |
| JP | 5-217177 | 8/1993 |
| JP | 6-223384 | 8/1994 |
| JP | 7-272286 | 10/1995 |
| JP | 7-302427 | 11/1995 |
| JP | 9-231583 | 9/1997 |
| JP | 10-112035 | 4/1998 |
| JP | 10-143875 | 5/1998 |
| JP | 11-120599 | 4/1999 |
| JP | 11-191223 | 7/1999 |
| JP | 11-339276 | 12/1999 |

* cited by examiner

Primary Examiner—Muhammad Edun
(74) Attorney, Agent, or Firm—Sughrue Mion, PLLC

(57) ABSTRACT

In case of pulling a focusing servo in a recording surface 2 of an optical disk 1, the focusing servo is pulled in a substrate surface 3 of the optical disk 1, thereafter, a focusing servo pull-in position is allowed to transfer to the recording surface 2 of the optical disk 1 by means of a focusing jump control circuit 12, whereby a focusing servo pull-in operation is made upon the recording surface 2, while an objective lens retreating control circuit 14 outputs a control signal in a direction along which the objective lens 4 is allowed to go away from the optical disk 1 for a predetermined time, and then, another control signal in a direction along which the objective lens 4 is allowed to be close to the optical disk 1 for a predetermined time in the case when an abnormal focusing servo pull-in operation was detected.

13 Claims, 6 Drawing Sheets

FOCUSING SERVO PULL-IN APPARATUS

FIELD OF THE INVENTION

The present invention relates to a focusing servo pull-in apparatus for pulling a focusing servo in a storage medium such as optical disk.

BACKGROUND OF THE INVENTION

In an optical disk unit, heretofore, a focusing servo pull-in operation, which means that light beams output from a laser light source are converged by the use of an objective lens, and a focusing position of the light beams is allowed to coincide with a film surface in an optical disk on which data is to be recorded/reproduced (hereinafter referred to as "recording surface") has been made. Furthermore, a relative position between a focusing position of light beams and a recording surface of an optical disk varies generally due to surface deviation in the optical disk. Accordingly, such focusing servo control that a focusing actuator for driving an objective lens in a direction of the optical axis of an optical system is used to keep the relative position constant is conducted in an optical disk unit.

On the other hand, reduction in focal length with increase in an numerical aperture of an objective lens advances in optical disk unit in recent years. As a result of reduction in focal length, a working distance of an objective lens in case of focusing servo controlling on a recording surface of an optical disk is reduced from a conventional distance of around 1 mm to around 0.1 mm, so that it is indispensable for providing a measure for avoiding a collision of the objective lens with the optical disk. Such measure for avoiding collision is particularly important in case of focusing servo pull-in controlling for a focusing actuator at the time when a degree of risk in collision is high, because a distance between the objective lens and the optical disk is indefinite.

Conventional focusing servo pull-in manners are classified roughly into a first to a third three manners. The first manner is such that a focusing search operation is made to obtain two focusing positions detected on a recording surface of an optical disk and a surface of a substrate layer (hereinafter referred to as "substrate surface") of the optical disk, from which the focusing position detected on the recording surface is extracted, and based on the extracted focusing position, a focusing servo is pulled in the recording surface.

For instance, as the first manner described above, there are Japanese Patent Laid-Open Nos. 150147/1982, 150148/1982, 129525/1988, 144425/1988, 223384/1994, 231583/1997, etc. wherein a manner for pulling a focusing servo in a recording surface by means of detecting the recording surface dependent upon appearing orders in moving directions of an objective lens, thereby focusing positions detected is disclosed. Moreover, for example, Japanese Patent Laid-Open No. 302427/1995 discloses such a manner that a recording surface is detected on the basis of appearing orders in moving directions of an objective lens and focusing positions detected as well as of differences in reflectivity of the recording surface and a substrate surface, whereby a focusing servo is pulled in the recording surface.

Besides, such a manner that a substrate surface is distinguished from a recording surface in an optical disk based on differences in intensity of light reflected by the optical disk, whereby a focusing servo is pulled in the recording surface is disclosed in Japanese Patent Laid-Open Nos. 12032/1991, 37828/1991, 225628/1991, 217177/1993, and 186532/1992. In Japanese Patent Laid-Open No. 272286/1995, such a manner that a difference in levels of focusing error signals in a recording surface and a substrate surface is detected by a difference in velocity signals of the focusing error signals, whereby a focusing servo is pulled in the recording surface has been disclosed. Japanese Patent Laid-Open No. 143875/1998 discloses such a manner that a recording surface is detected by the use of a high-frequency reproduction signal reproduced from the recording surface, whereby a focusing servo is pulled in the recording surface. In Japanese Patent Laid-Open No. 96829/1989, such a manner that a substrate surface is discriminated from a recording surface based on an existence of track modulation superimposed on focusing error signal, whereby a focusing servo is pulled in the recording surface has been disclosed.

In addition, Japanese Patent Laid-Open No. 48134/1986 discloses such a manner that a recording surface is detected on the basis of an appearing level of track error signals, whereby a focusing servo is pulled in the recording surface. Further, Japanese Patent Laid-Open No. 155425/1988 discloses such a manner that a time required for moving a distance extending from the lowermost point in an objective lens to a substrate surface in an optical disk is measured by pulling once a focusing servo in the substrate surface of the optical disk, and thereafter, the measured time is utilized in the case when the focusing servo pull-in operation is made again from the lowermost point of the objective lens, whereby the focusing servo is pulled in a recording surface by masking a focusing position detected in the substrate surface.

Next, as the second manner described above, there are, for example, Japanese Patent Laid-Open Nos. 28034/1985, 166195/1993, 112035/1998, 191223/1999, 120599/1999, etc. wherein a manner for preventing a collision of an objective lens with an optical disk by applying a voltage to a focusing actuator in a method for distancing an objective lens from an optical disk has been disclosed as a manner for retreating the objective lens in case of detecting abnormal pull-in or deviation of a focusing servo, or further in case where a focusing servo is in OFF state.

Moreover, as the third manner, for example, Japanese Patent Laid-Open No. 339276/1999 discloses such a manner that a focusing position of light beams is retreated to a substrate surface or a recording surface in a direction along which an objective lens comes away from an optical disk by means of focusing jump control in case of detecting deviation of a focusing servo, and after elapsing of a predetermined period of time, the focusing position of light beams is returned to the recording surface by the focusing jump control.

However, any of the first manners described in these Japanese Patent Laid-Open gazettes applies such manner that a focusing detection position was searched with respect to a recording surface as a target in case of pulling a focusing servo in the recording surface, and then, the focusing servo is pulled in the recording surface. Accordingly, decrease in working distance of an objective lens with reduction in focal point of the objective lens as mentioned above could not be compensated. Furthermore, the second manner involved such a problem that a focusing actuator collided with a supporting base of the focusing actuator, so that the focusing actuator was broken.

In this respect, an explanation will be made by referring to FIG. 1 wherein an amount of surface vibration in an optical disk is around 0.3 mm at the maximum. In order to retreat an objective lens under a condition wherein a working distance of the objective lens is around 0.1 mm and an amount of surface vibration in optical disk is less than the maximum value without accompanying any contact of the optical disk with the objective lens, it is necessary that a retreating speed of the objective lens is faster than an approaching speed in a relative distance defined between the objective lens and the optical disk with rotation of the disk during a period until the upper end of the objective lens shifts to a position where it is below the lower end of surface vibration in an orbiting of the optical disk (a period wherein the objective lens shifts a distance: Δy1 in FIG. 1). In the second manner, a manner for avoiding collision by means of applying a step-like voltage in a direction away from the optical disk to a focusing actuator in case of retreating the objective lens is adopted.

However, since focusing actuator has generally resonant characteristics, when only a voltage in a direction going away from an optical disk is applied in case of retreat, there has been such a problem that an objective lens collides with a supporting base of a focusing actuator due to an overshoot appearing transiently as shown in FIG. 1 as a retreating operation locus 20 of the objective lens (circle A in FIG. 1), so that the focusing actuator runs into breakdown. Such collision can be avoided by an arrangement wherein a movable range in a direction going away from an optical disk is kept sufficiently wide in a structure of a focusing actuator. However, it is not desirable, because there is also a need for a low-profile optical disk unit.

In the third manner, since a retreating control of an objective lens by means of controlling positions of the objective lens based on focusing jump being an open loop control is executed, when such an optical disk unit is employed under a situation wherein a transient excessive accelerated velocity might be applied to the objective lens such as cases of an abnormal pull-in of focusing servo, and a deviation of focusing servo, there has been an event where retreating malfunctions arise due to abnormal focusing jump, whereby a collision of the objective lens with the optical disk appears.

SUMMARY OF THE INVENTION

Accordingly, the present invention has been made in view of the above-described problems involved in the prior art.

An object of the present invention is to provide a focusing servo pull-in apparatus by which a focusing servo can be pulled in a recording surface without accompanying a collision of an objective lens with a storage medium or a supporting base of a focusing actuator even in a case where such a storage medium exhibiting a higher amount of surface vibration thereof than a thickness of a substrate layer thereof is used.

In order to achieve the above-described object, a focusing servo pull-in apparatus according to the present invention involving an objective lens for converging light beams emitted from a light source on a data storage medium, and a focusing actuator transferring the objective lens in a direction of optical axis, a focusing servo pull-in operation being effected by driving the objective lens in the direction of optical axis, comprises a means for outputting a focusing search control signal that transfers a position of focusing point in the light beams up to a position wherein a focusing servo operation of the storage medium can be made; a means for outputting a focusing jump control signal that transfers the position of focusing point in the light beams from a substrate surface of the storage medium to a recording film surface; a means for outputting a focusing servo control signal that allows the position of focusing point in the light beams to follow the substrate surface or the recording film surface of the storage medium; a control means for controlling a focusing servo pull-in operation by switching the focusing search control signal, the focusing jump control signal, and the focusing servo control signal to select a signal to be applied to the focusing actuator; and the control means searching a position of focusing on a substrate surface by means of the focusing search control signal, whereby a focusing is pulled in a substrate surface of the storage medium, and then, the position of focusing point in the light beams is transferred to the recording film surface of the storage medium by means of the focus jump control signal to effect the focusing servo pull-in operation.

In a focusing servo pull-in apparatus according to the above-described invention, the control means may select a signal to be applied to the focusing actuator based on outputs obtained from a focusing detection means for detecting to the effect that the position of focusing point in the light beams resides in a position where a focusing servo can be pulled in the substrate surface or the recording film surface of the storage medium; a recording film surface detection means for detecting to the effect that the position of focusing point in the light beams resides in the recording film surface of the storage medium; and a settling detection means for detecting to the effect that the focusing servo has been settled.

In a focusing servo pull-in apparatus according to the above-described invention, the focusing detection means may detect to the effect that the position of focusing point in the light beams resides in a position where a focusing servo can be pulled in the substrate surface or the recording film surface of the storage medium based on a focusing error signal and an intensity signal of light reflected by the storage medium.

In a focusing servo pull-in apparatus according to the above-described invention, the recording film detection means may detect to the effect that the position of focusing point in the light beams resides in the recording film surface of the storage medium based on a tracking error signal and an intensity signal of light reflected by the storage medium.

In a focusing servo pull-in apparatus according to the above-described invention, the settling detection means may detect to the effect that the focusing servo has been settled in the case where a settling condition based on a focus error signal and an intensity signal of light reflected by the storage medium is continuously satisfied for a predetermined period of time while a focusing servo control signal is applied to the focusing actuator.

In a focusing servo pull-in apparatus according to the above-described invention, the storage medium is a disk-shaped medium, and the predetermined period of time is a time required for the disk-shaped medium to rotate once or more.

Furthermore, in order to achieve the above-described object, a focusing servo pull-in apparatus according to the present invention involving an objective lens for converging light beams emitted from a light source on a data storage medium, and a focusing actuator transferring the objective lens in a direction of optical axis, a focusing servo pull-in operation being effected by driving the objective lens in the direction of optical axis, comprises a means for outputting a focusing search control signal that transfers a position of focusing point in the light beams up to a position wherein a focusing servo operation of the storage medium can be made; a means for outputting a focusing jump control signal that transfers the position of focusing point in the light beams from a substrate surface of the storage medium to a recording film surface; a means for outputting a focusing servo control signal that allows the position of focusing point in light beams to follow the substrate surface or the recording film surface of the storage medium; a means for outputting an objective lens retreating control signal for retreating the objective lens; a detection means for detecting an abnormal approach of the objective lens and the storage medium; a control means for controlling a focusing servo pull-in operation by switching the focusing search control signal, the focusing jump control signal, and the focusing servo control signal to select a signal to be applied to the focusing actuator; the control means searching a position of focusing on a substrate surface by means of the focusing search control signal, whereby a focusing servo is pulled in a substrate surface of the storage medium, and then, the position of focusing point in the light beams is transferred to the recording film surface of the storage medium by means of the focus jump control signal to effect the focusing servo pull-in operation; and the objective lens being retreated by applying the objective lens retreating control signal to the focusing actuator in the case when an abnormal approach of the objective lens with the storage medium was detected by the detection means during a focusing servo pull-in operation.

In a focusing servo pull-in apparatus according to the above-described invention, the control means may select a signal to be applied to the focusing actuator based on outputs obtained from a focusing detection means for detecting to the effect that the position of focusing point in the light beams resides in a position where a focusing servo can be pulled in the substrate surface or the recording film surface of the storage medium; a recording film surface detection means for detecting to the effect that the position of focusing point in the light beams resides in the recording film surface of the storage medium: and a settling detection means for detecting to the effect that the focusing servo has been settled.

In a focusing servo pull-in apparatus according to the above-described invention, the focusing detection means may detect to the effect that the position of focusing point in the light beams resides in a position where a focusing servo can be pulled in the substrate surface or the recording film surface of the storage medium based on a focusing error signal and an intensity signal of light reflected by the storage medium.

In a focusing servo pull-in apparatus according to the above-described invention, the recording film detection means may detect to the effect that the position of focusing point in the light beams resides in the recording film surface of the storage medium based on a tracking error signal and an intensity signal of light reflected by the storage medium.

In a focusing servo pull-in apparatus according to the above-described invention, the settling detection means may detect to the effect that the focusing servo has been settled in the case where a settling condition based on a focusing error signal and an intensity signal of light reflected by the storage medium is continuously satisfied for a predetermined period of time while a focusing servo control signal is applied to the focusing actuator.

In a focusing servo pull-in apparatus according to the above-described invention, the storage medium maybe a disk-shaped medium, and the predetermined period of time may be a time required for the disk-shaped medium to rotate once or more.

In a focusing servo pull-in apparatus according to the above-described invention, the means for outputting an objective lens retreating control signal may output a control signal in a direction along which the objective lens is allowed to go away from the storage medium, and then, may output another control signal along which the objective lens is allowed to be close to the storage medium, whereby the objective lens is braked.

BRIEF DESCRIPTION OF THE DRAWINGS

The present invention will be explained in more detail in conjunction with appended drawings, wherein.

DESCRIPTION OF THE PREFERRED EMBODIMENT

Figure 2:
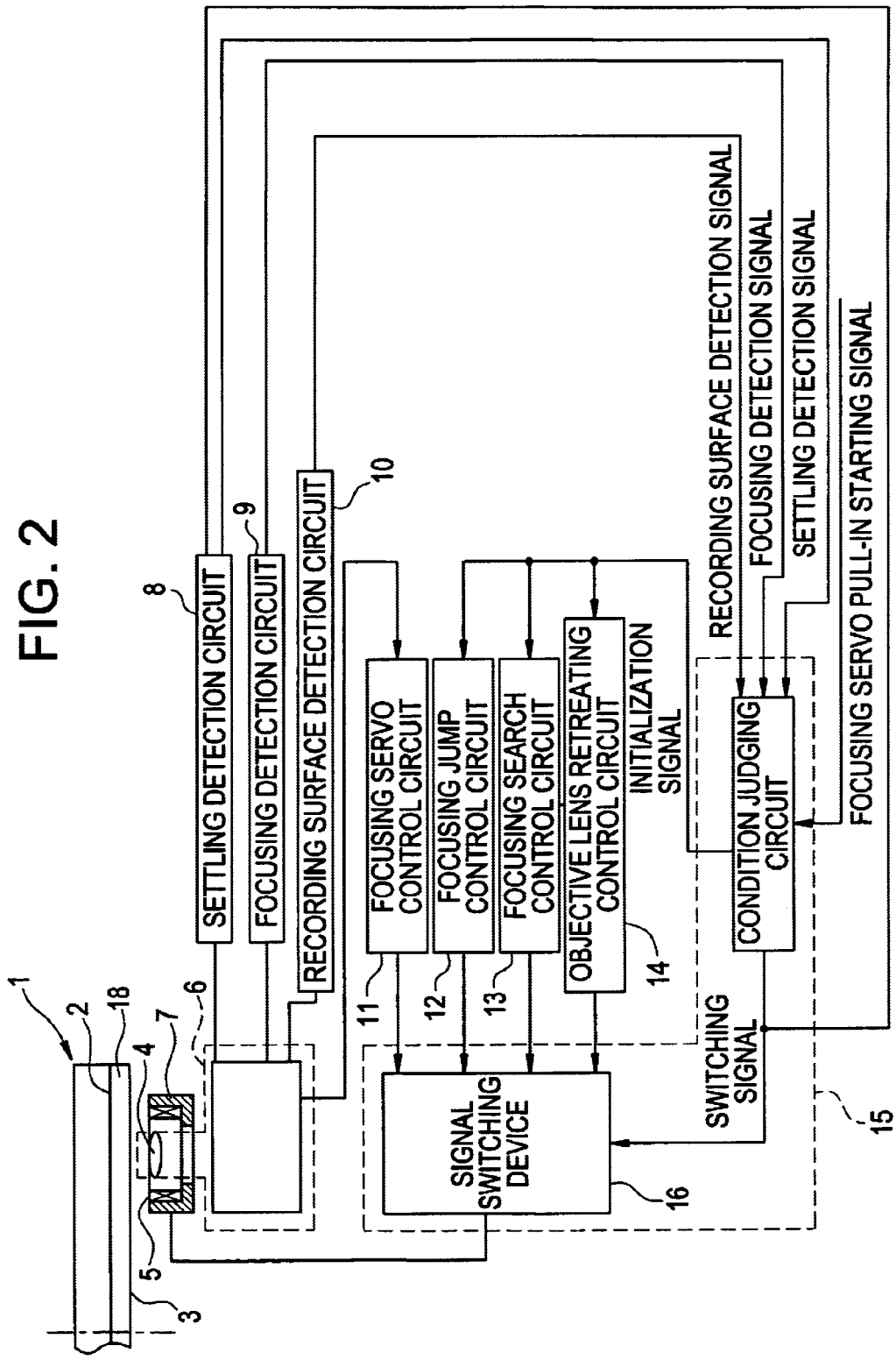
FIG. 2 is a block diagram showing a constitution of an embodiment of a focusing servo pull-in apparatus according to the present invention.

In the following, a preferred embodiment of the present invention will be described in detail in conjunction with the accompanying drawings wherein FIG. 2 is a block diagram showing a constitution of an embodiment of a focusing servo pull-in apparatus according to the present invention.

Referring to FIG. 2, an optical disk 1 being a storage medium for recording/reproducing is composed of a substrate layer 18, and a recording film 2 formed thereon for recording/reproducing data. A thickness of the substrate layer 18 is selected from known values dependent upon use applications of the optical disk 1. For instance, in case of an optical disk unit wherein an objective lens having a high numerical aperture of 0.7 or higher is used, an optical disk having the substrate layer 18 a thickness of which is around 0.1 mm is adopted. The optical disk 1 is rotated by a driving force of a spindle motor (not shown). Reference numeral 3 designates a surface of the substrate layer 18 of the optical disk 1.

Under the lower surface of the optical disk 1, an optical system 6 including an objective lens 4 is disposed. The optical system 6 is composed of a laser source being a light source for recording/reproducing use, an optical element for applying an optical treatment such as collimating treatment to laser beams output from the laser source, an optical sensor for detecting reflected light from the optical disk 1 and the like components. Laser beams output from the laser source in the optical system 6 is condensed by the objective lens 4 to be converged on the optical disk 1 in the form of minute optical spot. The objective lens 4 is transferred in a direction of optical axis (direction of optical axis of the optical system 6) by driving a focusing actuator 5. The focusing actuator 5 is mounted on a supporting base 7 of the focusing actuator.

Reflected light from the optical disk 1 is detected by the optical sensor in the optical system 6 through the objective lens 4 to be converted into electric signals, and the electric signals thus converted are output to a settling detection circuit 8, a focusing detection circuit 9, a recording surface detection circuit 10, and a focusing servo control circuit 11, respectively. The focusing detection circuit 9 is a circuit for outputting a focusing detection signal, which indicates to the effect that a position of focusing point in light beams resides at a position where a focusing servo can be pulled in the substrate surface 3 or the recording film 2 of the optical disk 1 based on an output signal from the optical system 6.

A focusing detection method is not specifically limited. For instance, such focusing detection method is realized by effecting the following conditional judgment in accordance with a manner wherein a focusing error signal and an intensity signal of reflected light are extracted from signals output from the optical system 6, and an absolute value circuit and a comparator circuit (both of them are not shown) are employed.

Absolute value of intensity signal of reflected light >$\alpha 1$, and absolute value of focusing error signal <$\beta 1$ ... (1) where $\alpha 1$ and $\beta 1$ are positive real numbers.

When the formula (1) is valid, a focusing detection signal=1 (focused), while when the formula (1) is invalid, the focusing detection signal=0 (not focused).

Accordingly, the focusing detection circuit 9 detects a position of focusing point by the use of the formula (1), and a focusing point detection signal is output to a condition judging circuit 17. It is to be noted, herein that a condition judgment by means of the formula (1) is called by the name of "condition judgment 1".

A recording surface detection circuit 10 is a circuit for outputting a recording surface detection signal, which exhibits to the effect that a position of focused point of light beams exists on the recording surface 2 in the optical disk 1 on the basis of an output signal from the optical system 6.

A detection method of recording surface is not specifically limited. For instance, such detection method is realized by effecting the following condition judgment in accordance with a manner wherein a tracking error signal and an intensity signal of reflected light are extracted from signals output from the optical system 6, and an absolute value circuit and a comparator circuit (both of them are not shown) are employed.

Absolute value of intensity signal of reflected light >$\alpha 2$, and absolute value of tracking error signal >$\beta 2$ ... (2) where $\alpha 2$ and $\beta 2$ are positive real numbers.

When the formula (2) is valid, a recording surface detection signal=1 (recording surface), while when the formula (2) is invalid, the recording surface detection signal=0 (not recording surface).

As described above, the recording surface detection circuit 10 detects such fact that a position of focusing point resides on the recording surface by the use of the formula (2), and a recording surface detection signal is output to the condition judging circuit 17. It is to be noted herein that a condition judgment by means of the formula (2) is called by the name of "condition judgment 2".

While a constitution relating to tracking control is omitted in FIG. 2, there are, in reality, a tracking actuator for transferring the objective lens 4 in a tracking direction, a circuit for producing tracking error signals from output signals of the optical system 6, and a circuit for implementing tracking control in such that light beams follow a data track in the rotating optical disk 1 based on tracking error signals.

Furthermore, a circuit for recording datas in the optical disk 1, a circuit for reproducing datas recorded in the optical disk 1 and the like are omitted in FIG. 2.

Due to principle of operation, there is a case where light beams do not traverse data tracks in the optical disk 1, so that no modulation is applied to tracking error signals, whereby no recording surface detection signal is obtained under such condition that an eccentricity of the optical disk 1 is zero or a value close to zero, and no external vibration is applied to the objective lens 4 and the optical disk 1 in the recording surface detection method according to the formula (2). In this case, it is possible to detect a recording surface by vibrating a tracking actuator for driving the objective lens 4 in a track traversing direction of the optical disk 1 by means of an output signal of a predetermined periodical signal generating circuit (not shown) in the track traversing direction in the optical disk 1, whereby tracking error signals are modulated.

The settling detection circuit 8 is a circuit for outputting a settling detection signal exhibiting such fact that a focusing servo has been settled based on an output signal of the optical system 6 and a switching signal output from the undermentioned condition judging circuit 17.

A settling detection method is not specifically limited. For instance, such settling detection method is realized by effecting the following conditional judgment in accordance with a manner wherein a focusing error signal and an intensity signal of reflected light are extracted from signals output from the optical system 6, and an absolute value circuit, a comparator circuit, and a timer circuit (all of them are not shown) are employed.

Absolute value of intensity signal of reflected light >$\alpha 3$, absolute value of focusing error signal <$\beta 3$, and a switching signal selects a focusing servo control signal .... (3) where $\alpha 3$ and $\beta 3$ are positive real numbers.

When the formula (3) is valid continuously for a predetermined period of time T1 or more, a settling detection signal=1 (settled), while when the formula (3) is invalid or it is not valid continuously for a predetermined period of time T1, the settling detection signal=0 (not settled).

The reference character T1 designates a period of time measured by the timer circuit. The period of time T1 may be an arbitrary time, but it is desired to be a time constant or more in focusing servo loop frequency characteristics in view of focusing servo control characteristics.

As described above, the settling detection circuit 8 detects such fact that the focusing servo has been settled by the use of the formula (3), and a settling detection signal is output to the condition judging circuit 17. It is to be noted herein that a condition judgment by means of the formula (3) is called by the name of "condition judgment 3".

When dust or the like adheres on a substrate surface of the optical disk 1, an absolute value of intensity signal of reflected light decreases to a value near to zero. Accordingly, when a value of $\alpha 3$ is set to around half of the maximum value of intensity of reflected light, the formula (3) becomes invalid in a dust adhering section.

In the case where a period of time T1 has been set to a time required for one turn or more of the optical disk 1, it can be judged that no adhering of dust on the substrate surface 3 is observed on orbiting of the optical disk 1 where the objective lens 4 resides, when the conditional judgment 3 is valid in settling detection at the time of pulling a focusing servo in a substrate surface. On the other hand, when the condition judgment 3 is invalid, it becomes impossible to pull a focusing servo in a substrate surface, but it can be judged that there is a possibility of dust adhesion on the substrate surface. Since a height of dust or the like exceeds easily 0.1 mm, when a period of time T1 is set to a time for one turn or more of the optical disk 1, such an advantage that a margin of working distance can be simultaneously increased also for preventing a collision of dust adhered on the substrate surface with the objective lens 4 is obtained.

The condition judging circuit 17 is a circuit for supplying switching signals to a signal switching device 16 based on recording surface detection signal, focusing detection signal, settling detection signal, and focusing servo pull-in starting signal. A control signal applied to the focusing actuator 5 is switched by a switching signal of the condition judging circuit 17, whereby pull-in of a focusing servo is controlled. Furthermore, the condition judging circuit 17 outputs an initialization signal to a focusing jump control circuit 12, a focusing search control circuit 13, and an objective lens retreating control circuit 14. A control signal selecting means 15 is composed of the condition judging circuit 17 and the signal switching device 16.

The focusing servo control circuit is such a circuit that a focusing error signal is extracted from an output signal of the optical system 6, and the focusing error signal is subjected to a signal processing such as phase compensation filter arithmetic processing, whereby a focusing servo control signal being a first control signal for conducting focusing servo operation is output.

The focusing search control circuit 13 starts to output a focusing search control signal being a second control signal, when an initialization signal is input from the condition judging circuit 17. The focusing search control circuit 13 is a circuit for outputting a control signal for driving the objective lens 4 in a direction of optical axis of the optical system 6 immediately after starting to pull in a focusing servo, whereby a position of focusing point in light beams is transferred to a vicinity of the substrate surface 3 of the optical disk 1.

The focusing jump control circuit 12 starts to output a focusing jump control signal being a third control signal after an initialization signal is input from the condition judging circuit 17. The focusing jump control signal is a control signal for transferring a position of focusing point in light beams from the substrate surface 3 to the recording surface 2.

The objective lens retreating control circuit 14 starts to output an objective lens retreating control signal being a fourth control signal after an initialization signal is input from the condition judging circuit 17. The objective lens retreating control signal is a control signal for retreating the objective lens 4 to a position for starting focusing servo pull-in operation without accompanying contact of the objective lens 4 with the optical disk 1 or contact of the objective lens 4 with the focusing actuator supporting base 7 in the case when abnormal focusing servo pull-in operation is detected by the condition judging circuit 17.

It is desirable that the position for starting focusing servo pull-in operation is set to a position where a position of focusing point in light beams becomes more away from the optical disk 1 than the substrate surface 3 of the optical disk 1 in view of such fact that an advantage for increasing a margin of working distance in the objective lens 4 can make the maximum.

The signal switching device 16 switches a focusing servo control signal output from the focusing servo control circuit 11, a focusing jump control signal output from the focusing jump control circuit 12, a focusing search control signal output from the focusing search control circuit 13, and an objective lens retreating control signal output from the objective lens retreating control circuit 14 in response to a switching signal output from the condition judging circuit 17, and these switched signals are output to the focusing actuator 5 mounted on the focusing actuator supporting base 7 as focusing actuator driving signals. As a result, the focusing actuator 5 transfers the objective lens 4 in a direction of optical axis of the optical system 6 by means of the focusing actuator driving signals output from the signal switching device 16.

Figure 3:
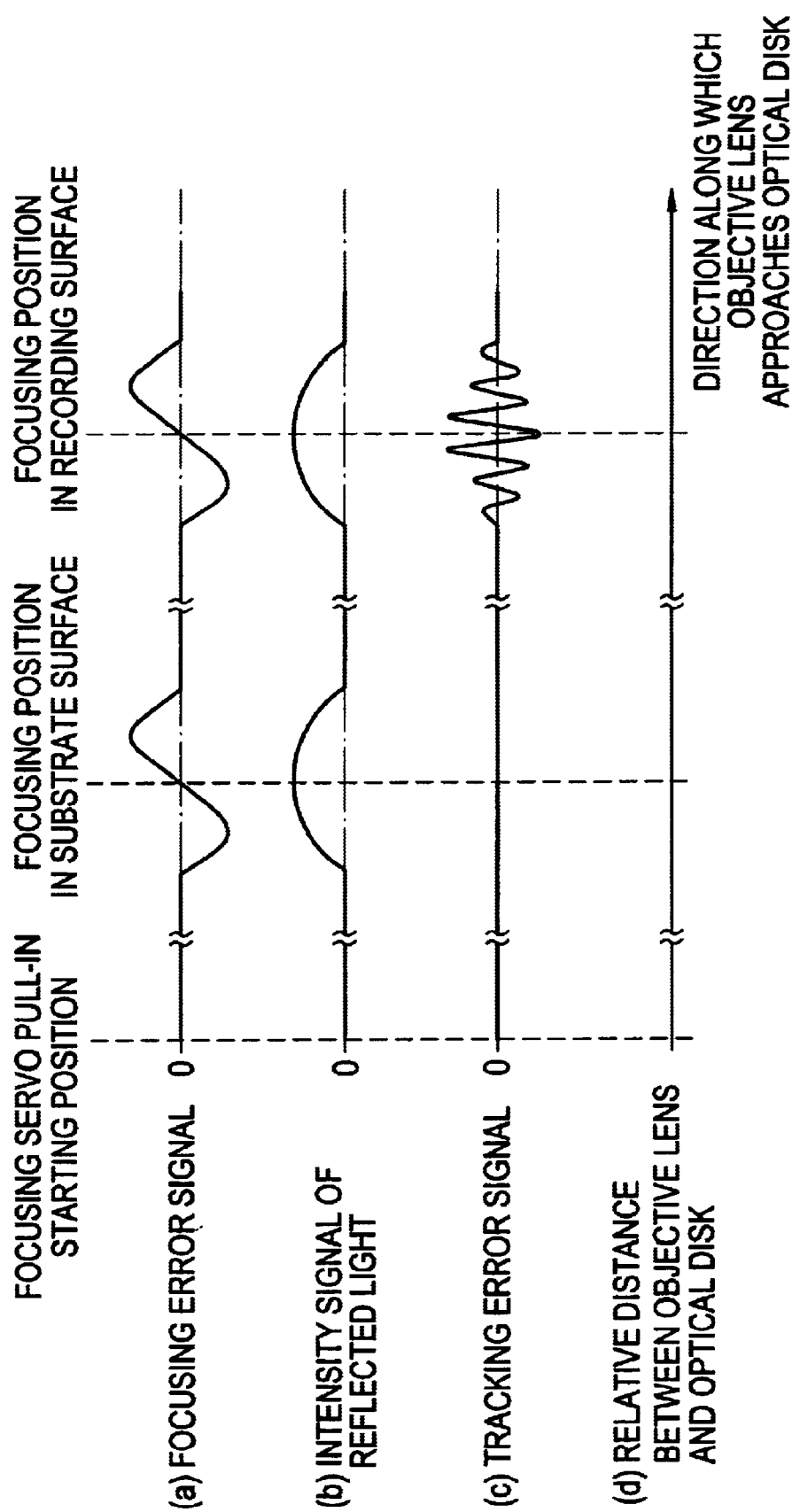
FIGS. 3(a), 3(b), 3(c), and 3(d) are diagrams showing a focusing error signal, an intensity signal of light reflected by an optical disk, a tracking error signal, and a relative distance between an objective lens and an optical disk in the case where the objective lens according to the embodiment shown in FIG. 2 is allowed to be close to the optical disk.

In the following, operations of the present embodiment will be described. For the simplicity of explanation, it is assumed that a reflection coefficient of the optical disk 1 in the surface of the substrate layer 18 and that of a surface in the recording film 2 are substantially equal to each other. It is to be noted that, however, even if such reflection coefficients in both the surfaces are different form one another, operations thereof do not differ from the former case. FIGS. 3($a$), 3($b$), 3($c$), and 3($d$) show signals in respective segments in the case where the objective lens 4 is allowed to be close to the optical disk 1 wherein FIG. 3($a$) shows a focusing error signal, FIG. 3($b$) shows an intensity signal of reflected light, FIG. 3($c$) shows a tracking error signal, and FIG. 3($d$) shows a relative distance between the objective lens 4 and the optical disk 1.

As shown in FIG. 3($a$), a focusing error signal is obtained as an S-shaped signal in the vicinities of the substrate surface 3 and a surface of the recording film 2 in the optical disk 1. Furthermore, as shown in FIG. 3($b$), an intensity signal of reflected light is obtained as a signal of one polarity having the maximum value in the vicinities of the substrate surface 3 and a surface of the recording film in the optical disk 1. Moreover, as shown in FIG. 3($c$), a tracking error signal is obtained as a one cycle sinusoidal wave signal in each occasion where light beams traverse data tracks in the vicinity of the recording surface of the optical disk 1. In the case where a focusing servo is pulled in as mentioned above, when the objective lens 4 is driven in a direction of optical axis, signals in the respective segments are obtained as shown in FIGS. 3($a$) through 3($c$).

Figure 4:
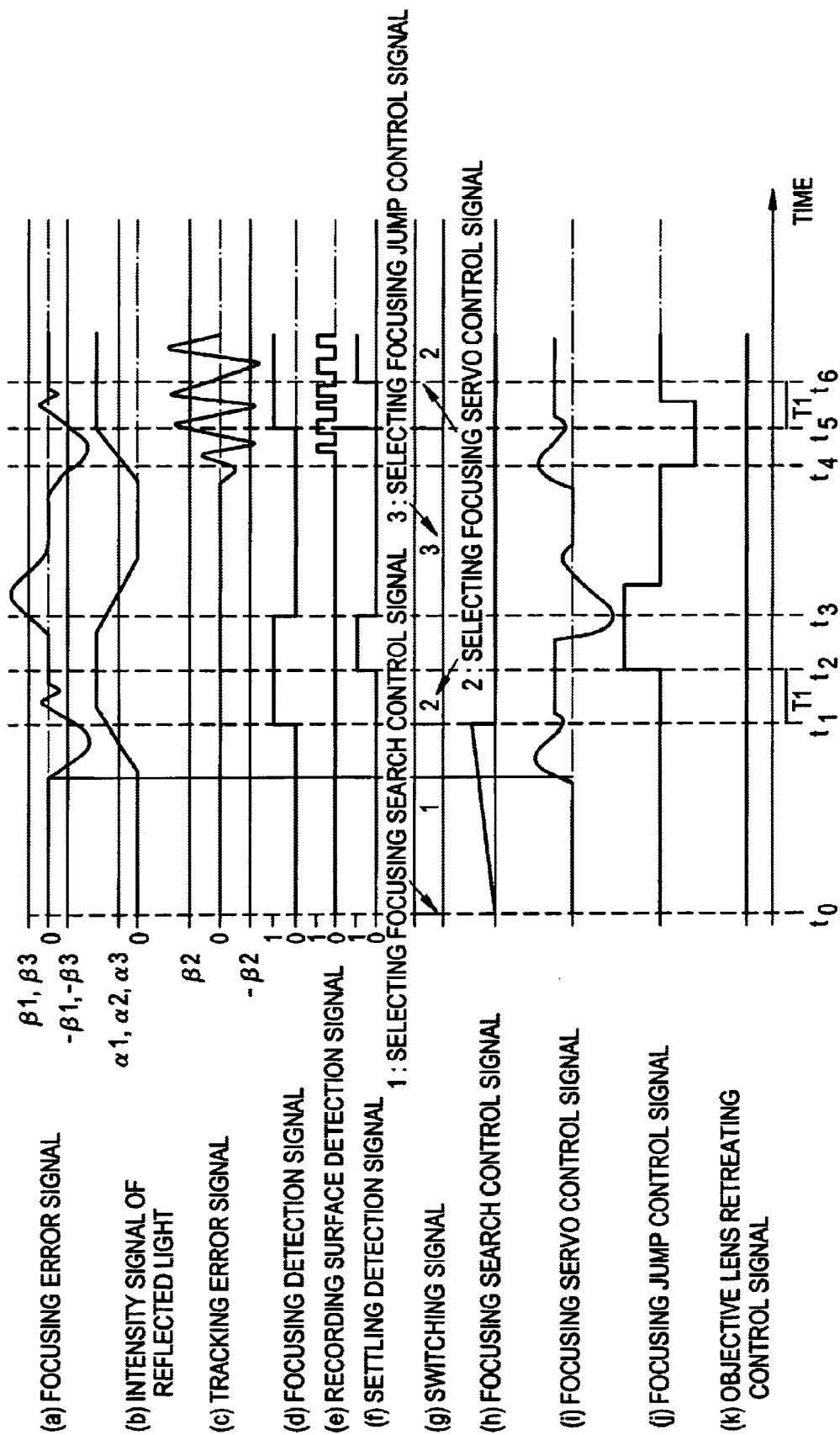
FIGS. 4(a) through 4(k) are time charts showing signals in respective segments in the case where the focusing servo is normally pulled in accordance with the embodiment shown in FIG. 2.

FIGS. 4($a$) through 4($k$) are waveform charts each showing an operational waveform in the case where a focusing servo pull-in operation has been completed normally in the surface of the recording film 2 in the optical disk 1 at the time of such operation. For the simplicity of explanation in FIGS. 4($a$) through 4($k$), coefficients among the formulae (1) through (3) have been set up as $\alpha1=\alpha2=\alpha3$, and $\beta1=\beta3$. However, it is desirable that an optimal value is experimentally determined in each of detecting operations from practical point of view.

First, when a focusing servo pull-in starting signal is input from a superordinate control circuit to the condition judging circuit 17, the condition judging circuit 17 outputs an initialization signal to the focusing search control circuit 13, besides, a switching signal for selecting a focusing search control signal is output to the signal switching device 16 (time instant to in respective FIGS. 4($a$) through 4($k$)) as shown in FIG. 4($g$). In the signal switching device 16, a focusing search control signal of the focusing search control circuit 13 is selected in response to the switching signal, and a lamp-shaped focusing search control signal is applied to the focusing actuator 5 as shown in FIG. 4(h). As a result, the focusing actuator 5 drives the objective lens 4, so that the objective lens 4 approaches gradually to the optical disk 1 from a focusing servo pull-in starting position.

On one hand, the focusing detection circuit 9 implements the condition judgment 1 by employing the focusing error signal shown in FIG. 4(a) and the intensity signal of reflected light shown in FIG. 4(b) in accordance with the formula (1) to detect a position of focusing point in light beams. In this case, when the position of focusing point in light beams reaches the substrate surface 3 of the optical disk 1, the condition judgment 1 is valid, so that a focusing detection signal=1 is output from the focusing detection circuit 9 (time instant t1) as shown in FIG. 4(d). When the focusing detection signal becomes one (1), the condition judging circuit 17 outputs a switching signal for selecting a focusing servo control signal in the focusing servo control circuit 11 as shown in FIG. 4(g). As a result, a focusing servo control signal is selected in the signal switching device 16 as shown in FIG. 4(i) to be applied to the focusing actuator 5. In this occasion, the focusing actuator 5 is driven by a focusing servo control signal in such that a position of focusing point in light beams coincides with the substrate surface 3 of the optical disk 1, so that a focusing servo is pulled in the substrate surface 3 of the optical disk 1.

When the focusing servo is pulled in the substrate surface 3, the settling detection circuit 8 detects to the effect that the focusing servo has been settled. Namely, the condition judgment 3 is made in the settling detection circuit 8 in accordance with the formula (3), so that when the formula (3) is valid for a predetermined period T1 or longer clocked by a timer circuit, the settling detection circuit a outputs a settling detection signal 1 (time instant t2) as shown in FIG. 4(f). When the settling detection signal becomes 1, the condition judging circuit 17 outputs an initialization signal to the focusing jump control circuit 12, and in addition, outputs a switching signal for selecting a focusing jump control signal as shown in FIG. 4(g). As a result, such a focusing jump control signal is selected in a direction along which the objective lens 4 is made to be close to the optical disk 1 is selected as shown in FIG. 4(j) to be applied to the focusing actuator 5. When the focusing jump control signal is applied, the objective lens 4 approaches the optical disk 1, whereby a position of focusing point in light beams transfers from the substrate surface 3 of the optical disk 1 towards the recording film 2.

When the position of focusing point in light beams transfers up to the vicinity of a surface of the recording film 2 in the optical disk 1, a pulse signal in a direction along which the objective lens 4 is made apart from the optical disk 1 is output from the focusing jump control circuit 12 as shown in FIG. 4(j) to be applied to the focusing actuator 5 (time instant t4). Moreover, a focusing detection signal becomes once zero (0) at a time instant t3 after a focusing jump control signal was output as shown in FIG. 4(d), and when a position of focusing point in light beams comes to be close to the recording film 2 of the optical disk 1, the focusing detection signal changes again to one (1) at a time instant t5 as shown in FIG. 4(d). When the focusing detection signal becomes again one (1), the condition judging circuit 17 outputs a switching signal for selecting a focusing servo control signal to the signal switching device 16 as shown in FIG. 4(g), whereby a focusing servo control signal from the focusing servo control circuit 11 is applied to the focusing actuator 5. As a result, a position of focusing point in light beams transfers from the substrate surface 3 of the optical disk 1 to the recording film 2, so that a focusing servo pull-in operation is completed.

Figure 5:
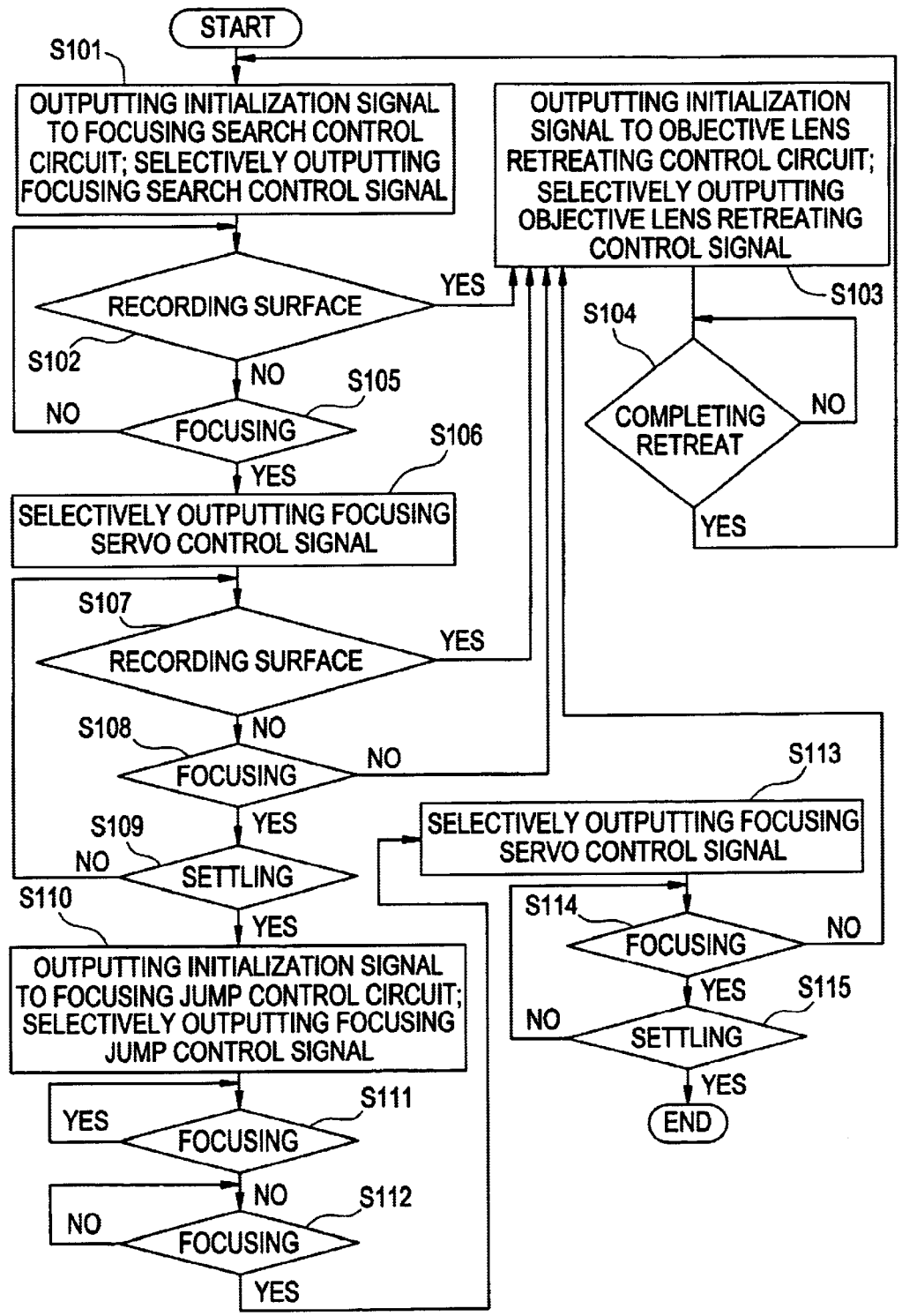
FIG. 5 is a flowchart for explaining operations of a condition judging circuit in the embodiment shown in FIG. 2.

In the following, operations of the condition judging circuit 17 will be described by referring to a flowchart of FIG. 5. In FIG. 5, first, when a focusing servo pull-in starting signal is output, the condition judging circuit 17 outputs an initialization signal to the focusing search control circuit 13, and in addition, outputs a switching signal for selecting a focusing search control signal to the signal switching device 16 (S101). As a result, the objective leans 4 approaches the optical disk 1 from a focusing pull-in starting position. In this case, the recording surface detection circuit 10 conducts the condition judgment 2 in accordance with the formula (2) by the use of an intensity signal of reflected light and a tracking error signal as mentioned above, whereby a recording surface of the optical disk 1 is detected (S102).

When the recording surface detection circuit 10 detects a recording surface, it outputs a recording surface detection signal=1. When the recording surface detection signal 1 is output, the condition judging circuit 17 judges to the effect that abnormal approach appears between the objective lens 4 and the optical disk 1, so that the condition judging circuit 17 outputs an initialization signal to the objective lens retreating control circuit 14, and in addition, outputs a switching signal for selecting an objective lens retreating control signal to the signal switching device 16 (S103). Thus, an objective lens retreating control signal is applied to the focusing actuator 5, whereby a collision of the objective lens 4 with the optical disk 1 is avoided. With respect to such objective lens retreating operation will be mentioned in detail hereinafter. When retreating control is completed (S104), a treatment from the step S101 is implemented again. In this case, it is easy to realize completion of retreating operations of the objective lens 4 by such a manner that a time for outputting an objective lens retreating control signal has been previously set, and after elapsing of such time, it is judged that retreat of the objective lens 4 has been completed.

On the other hand, when a recording surface was not detected in the step S102, a procedure proceeds to a step S105. When the focusing detection signal 1 is output from the focusing detection circuit 9, the condition judging circuit 17 outputs a switching signal for selecting a focusing servo control signal to the signal switching device 16 (S106). Thus, a focusing servo control signal is applied to the focusing actuator 5, so that a focusing servo is pulled in the substrate surface 3 of the optical disk 1. In this case, either when the recording surface was detected in a step S107 after the focusing servo had been pulled in, or when the recording surface was not detected and a focusing detection was not implemented in a step S108, it is judged that there is an abnormal pull-in condition in the focusing servo, and the procedure proceeds to the step S103 wherein a similar treatment is made. Namely, an initialization signal is output to the objective lens retreating control circuit 14, and a switching signal for selecting an objective lens retreating control signal is output to the signal switching device 16, whereby a retreating control for the objective lens 4 is implemented.

Furthermore, when a recording surface was not detected in the step S107 and focusing detection was made in the step S108, the procedure waits for outputting a settling detection signal in a step S109. When the settling detection signal 1 is output, the condition judging circuit 17 judges to complete that a focusing servo has been pulled in the substrate surface 3. When it was completed that the focusing servo had been pulled in the substrate surface 3, the condition judging circuit 17 outputs an initialization signal to the focusing jump control circuit 12, and in addition, a switching signal for selecting a focusing jump control signal to the signal switching device 16 (S110). Hence, the focusing jump control signal is applied to the focusing actuator 5, so that the objective lens 4 approaches the optical disk 1.

During the focusing jump control, when focusing detection is not once conducted in a step S111 and focusing detection is made again in a step S112, the condition judging circuit 17 outputs a switching signal for selecting a focusing servo control signal to the signal switching device 16 (S113). As a result, a focusing servo control signal is applied to the focusing actuator 5, whereby a focusing servo is pulled in a surface of the recording film 2 in the optical disk 1. Moreover, when focusing detection was not made with respect to the recording film 2 in a step S114 after a focusing servo was pulled in the recording film 2, the condition judging circuit 17 judges that there is an abnormal focusing pull-in condition, so that retreating control of the objective lens 4 is conducted in the step S103.

Namely, an initialization signal is output to the objective lens retreating control circuit 14, and a switching signal for selecting an objective lens retreating control signal is output to the signal switching device 16. As a result, a retreating control signal is applied to the focusing actuator 5 to implement retreating control of the objective lens 4. When the retreating control is completed in the step S104, the procedure effects the same treatments as that described above from the step S101.

Moreover, when a focusing operation is detected on the recording film 2 in the step S114 and setting of a focusing servo is detected in a step S115, the condition judging circuit 17 judges to finish that a focusing servo was pulled in the recording film 2 of the optical disk 1, whereby a series of focusing servo pull-in operations is completed.

Figure 6:
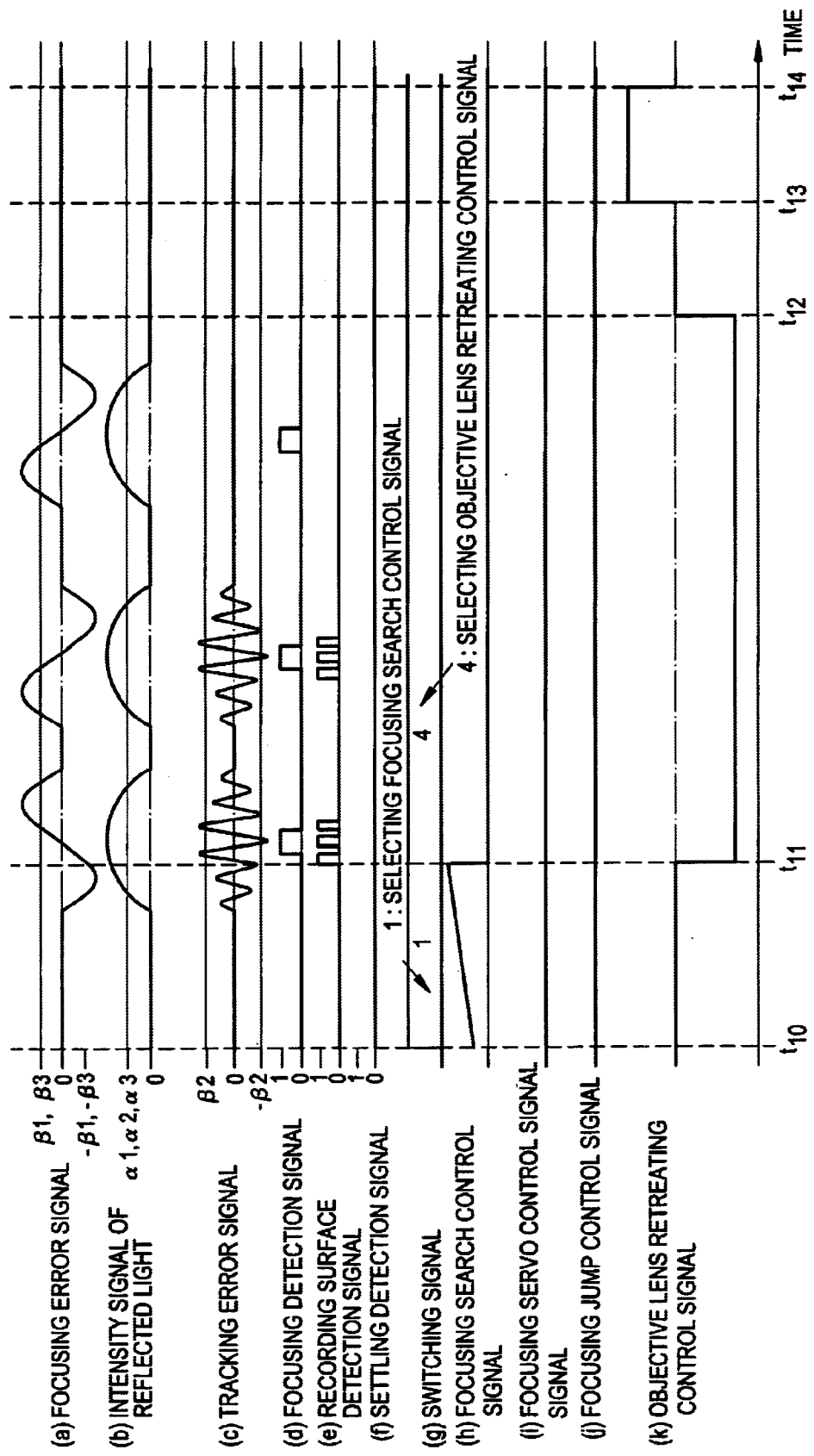
FIGS. 6(a) through 6(k) are time charts showing signals in respective segments in the case where a retreating control is made upon the objective lens in accordance with the embodiment shown in FIG. 2.

In the following, focusing servo pull-in operations including retreating control operations of the objective lens 4 will be described in detail by referring to FIGS. 6(*a*) through 6(*k*). Retreating control for an objective Lens in the case where a recording surface was detected while outputting a focusing search control signal after a focusing servo pull-in operation was started will be described herein. It is assumed that first, a focusing servo pull-in operation is started, thereafter, a switching signal for selecting a focusing search control signal is output from the condition judging circuit 17 as shown in FIG. 6(*g*), and a lamp-shaped focusing search control signal is applied to the focusing actuator 5 as shown in FIG. 6(*h*). In this case, the recording surface detection circuit 10 is detecting a position of focusing point in light beams, and when it detects that the position of focusing point in light beams resides on the recording film 2 of the optical disk 1, the recording surface detection signal 1 is output as shown in FIG. 6(*e*). The recording surface detection circuit 10 implements the condition judgment 2 by the use of an intensity signal of reflected light shown in FIG. 6(*b*) and a tracking error signal shown in FIG. 6(*c*) in accordance with the formula (2) as mentioned above, whereby a recording surface is detected.

When the recording surface detection signal 1 is output, the condition judging circuit 17 outputs an initialization signal to the objective lens retreating control circuit 14, and in addition, outputs a switching signal for selecting an objective lens retreating control signal to the signal switching device 16 as shown in FIG. 6(*g*) (time instant t11). As a result, a control signal in a direction along which the objective lens 4 is allowed to be away from the optical disk 1 is applied to the focusing actuator 5 during a predetermined period of time extending form the time instant t11 to a time instant t12. As a result of application of such control signal, when the upper end of the objective lens 4 transfers to a position corresponding to the one, which is below the lower end of surface vibration within one orbiting of the optical disk 1 (time instant t13), a control signal in a direction along which the objective lens 4 is allowed to be close to the optical disk 1 is output from the objective lens retreating control circuit 14 for a predetermined period of time extending from the time instant t13 to a time instant t14 as shown in FIG. 6(*k*), so that the objective lens 4 is braked.

As described above, when an abnormal approach of the objective lens 4 with respect to the optical disk 1 was detected, retreating control of the objective lens 4 is carried out, whereby the objective lens 4 is retreated, so that contact of the objective lens 4 with the optical disk 1 can be avoided.

On one hand, in the present embodiment, a control signal in a direction along which the objective lens 4 is allowed to be away from the optical disk 1 is applied to the focusing actuator 5 for a predetermined period of time, and then, a control signal in a direction along which the objective leans 4 approaches the optical disk 1 is applied for a predetermined period of time in case of retreating control for the objective lens 4. Accordingly, a retreating operation of the objective lens 4 can be realized without accompanying a collision of the objective lens 4 with the focusing actuator supporting base 7.

Figure 1:
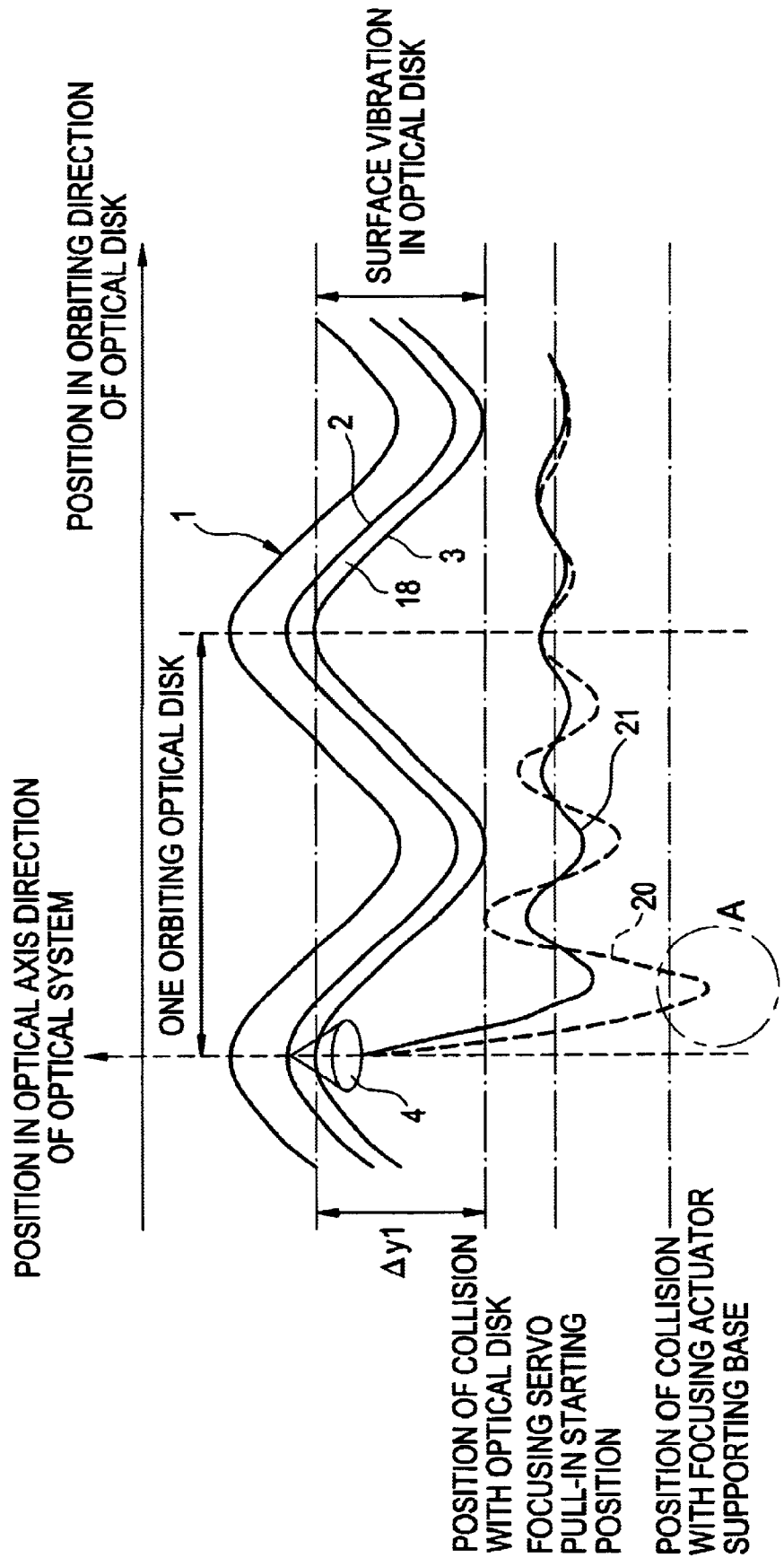
FIG. 1 is a diagram showing each locus of an objective lens in the case where focusing servo pull-in operations were made by means of a focusing servo pull-in apparatus of the prior art in comparison with that of the present invention.

FIG. 1 is a diagram showing loci of the objective lens 4 in case of retreating control of the objective lens 4 wherein a locus 21 drawn by a solid line is in case of the present embodiment. Furthermore, reference numeral 1 designates an optical disk, 2 a recording film, 3 a surface of substrate layer, and 4 an objective lens, respectively.

It is assumed herein that the objective lens 4 is in a position shown in FIG. 1, and a position of focusing point in light beams is located in the vicinity of the recording film 2 of the optical disk 1. In this case, when an abnormal approach of the objective lens 4 with respect to the optical disk 1 was detected, an objective lens retreating control signal is applied to the focusing actuator 5 as mentioned above, so that the objective lens 4 converges to a focusing servo pull-in starting position while going along the locus 21. Accordingly, the objective lens 4 can be retreated without accompanying a collision of the objective lens 4 with the optical disk 1, or of the objective lens 4 with the focusing actuator supporting base 7 as is apparent from FIG. 1.

Furthermore, when an abnormal operation was detected in the step S102, S107, S108, or S114 in the flowchart of FIG. 5, retreating control as described in FIGS. 6(*a*) through 6(*k*) as well as FIG. 1 is performed, respectively. In this case, it is desired that a value of amplitude and an outputting time of an objective lens retreating control signal in case of each retreating control be selected optimally in every retreating operations.

As described above, according to the present invention, when a focusing servo is pulled in a recording surface of a storage medium, the focusing servo is pulled in the recording surface in accordance with such a manner that the focusing servo was once pulled in a substrate surface, and then, the objective lens is subjected to jump control. Accordingly, a distance corresponding to a thickness of a substrate layer in the storage medium can be increased as a working distance margin in case of a focusing servo pull-in operation, which accompanies a focusing search operation involving a high degree of danger in collision because a distance between the objective lens and the storage medium is not constant, so that a collision of the objective lens with the storage medium can be avoided in case of focusing servo pull-in operations.

Namely, since a distance extending from a focusing servo pull-in starting position to the storage medium is indefinite, there is a fear of a collision of the objective lens with the storage medium in case of a focusing servo pull-in operation. However, such focusing servo pull-in operation is realized by transferring a substrate layer of the storage medium a substantial distance of which is apparent in accordance with focusing jump control, so that the focusing servo can be pulled in without accompanying a collision of the objective lens with the storage medium.

Besides, when an abnormal operation was detected in case of a focusing servo pull-in operation, such retreating control that an overshoot in a focusing actuator produced at the time of retreating the focusing actuator is reduced is performed. Therefore, such a retreating operation of the focusing actuator can be realized with no collision of an objective lens with a storage medium as well as no collision of an objective lens with a focusing actuator supporting base, even if a storage medium wherein an amount of surface vibration is larger than a thickness of a substrate layer is used.

The presently disclosed embodiment is therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A focusing servo pull-in apparatus involving an objective lens for converging light beams emitted from a light source on a data storage medium, and a focusing actuator transferring said objective lens in a direction of optical axis, a focusing servo pull-in operation being effected by driving said objective lens in the direction of optical axis, comprising:
    a means for outputting a focusing search control signal that transfers a position of focusing point in said light beams up to a position wherein a focusing servo operation of said storage medium can be made;
    a means for outputting a focusing jump control signal that transfers said position of focusing point in the light beams from a substrate surface of said storage medium to a recording film surface;
    a means for outputting a focusing servo control signal that allows said position of focusing point in the light beams to follow the substrate surface or the recording film surface of said storage medium;
    a control means for controlling a focusing servo pull-in operation by switching said focusing search control signal, said focusing jump control signal, and said focusing servo control signal to select a signal to be applied to said focusing actuator; and
    said control means searching a position of focusing on a substrate surface by means of said focusing search control signal, whereby a focusing servo is pulled in a substrate surface of said storage medium, and then, the position of focusing point in the light beams is transferred to the recording film surface of said storage medium to effect the focusing servo pull-in operation.

2. A focusing servo pull-in apparatus as claimed in claim 1, wherein:
    said control means selects a signal to be applied to the focusing actuator based on outputs obtained from a focusing detection means for detecting to the effect that said position of focusing point in the light beams resides in a position where a focusing servo can be pulled in the substrate surface or the recording film surface of said storage medium; a recording film surface detection means for detecting to the effect that said position of focusing point in the light beams resides in said recording film surface of the storage medium; and a settling detection means for detecting to the effect that the focusing servo has been settled.

3. A focusing servo pull-in apparatus as claimed in claim 2, wherein:
    said focusing detection means detects to the effect that said position of focusing point in the light beams resides in a position where a focusing servo can be pulled in the substrate surface or the recording film surface of said storage medium based on a focusing error signal and an intensity signal of light reflected by the storage medium.

4. A focusing servo pull-in apparatus as claimed in claim 2, wherein:
    said recording film detection means detects to the effect that said position of focusing point in the light beams resides in the recording film surface of said storage medium based on a tracking error signal and an intensity signal of light reflected by the storage medium.

5. A focusing servo pull-in apparatus as claimed in claim 2, wherein:
    said settling detection means detects to the effect that the focusing servo has been settled in the case where a settling condition based on a focusing error signal and an intensity signal of light reflected by the storage medium is continuously satisfied for a predetermined period of time while a focusing servo control signal is applied to said focusing actuator.

6. A focusing servo pull-in apparatus as claimed in claim 5, wherein:
    said storage medium is a disk-shaped medium, and said predetermined period of time is a time required for the disk-shaped medium to rotate once or more.

7. A focusing servo pull-in apparatus involving an objective lens for converging light beams emitted from a light source on a data storage medium, and a focusing actuator transferring said objective lens in a direction of optical axis, a focusing servo pull-in operation being effected by driving said objective lens in the direction of optical axis, comprising:
    a means for outputting a focusing search control signal that transfers a position of focusing point in said light beams up to a position wherein a focusing servo operation of said storage medium can be made;
    a means for outputting a focusing jump control signal that transfers said position of focusing point in the light beams from a substrate surface of said storage medium to a recording film surface;
    a means for outputting a focusing servo control signal that allows said position of focusing point in the light beams to follow the substrate surface or the recording film surface of said storage medium;
    a means for outputting an objective lens retreating control signal for retreating said objective lens;
    a detection means for detecting an abnormal approach of said objective lens and said storage medium;
    a control means for controlling a focusing servo pull-in operation by switching said focusing search control signal, said focusing jump control signal, and said focusing servo control signal to select a signal to be applied to said focusing actuator;

said control means searching a position of focusing on a substrate surface by means of said focusing search control signal, whereby a focusing servo is pulled in a substrate surface of said storage medium, and then, the position of focusing point in the light beams is transferred to the recording film surface of said storage medium by means of said focusing jump control signal to effect the focusing servo pull-in operation; and said objective lens being retreated by applying said objective lens retreating control signal to said focusing actuator in the case when an abnormal approach of the objective lens with the storage medium was detected by said detection means during a focusing servo pull-in operation.

8. A focusing servo pull-in apparatus as claimed in claim 7, wherein:

said control means selects a signal to be applied to the focusing actuator based on outputs obtained from a focusing detection means for detecting to the effect that said position of focusing point in the light beams resides in a position where a focusing servo can be pulled in the substrate surface or the recording film surface of said storage medium; a recording film surface detection means for detecting to the effect that said position of focusing point in the light beams resides in said recording film surface of the storage medium; and a settling detection means for detecting to the effect that the focusing servo has been settled.

9. A focusing servo pull-in apparatus as claimed in claim 8, wherein:

said focusing detection means detects to the effect that said position of focusing point in the light beams resides in a position where a focusing servo can be pulled in the substrate surface or the recording film surface of said storage medium based on a focusing error signal and an intensity signal of light reflected by the storage medium.

10. A focusing servo pull-in apparatus as claimed in claim 8, wherein:

said recording film detection means detects to the effect that said position of focusing point in the light beams resides in the recording film surface of said storage medium based on a tracking error signal and an intensity signal of light reflected by the storage medium.

11. A focusing servo pull-in apparatus as claimed in claim 8, wherein:

said settling detection means detects to the effect that the focusing servo has been settled in the case where a settling condition based on a focusing error signal and an intensity signal of light reflected by the storage medium is continuously satisfied for a predetermined period of time while a focusing servo control signal is applied to said focusing actuator.

12. A focusing servo pull-in apparatus as claimed in claim 11, wherein:

said storage medium is a disk-shaped medium, and said predetermined period of time is a time required for the disk-shaped medium to rotate once or more.

13. A focusing servo pull-in apparatus as claimed in claim 7, wherein:

said means for outputting an objective lens retreating control signal outputs a control signal in a direction along which said objective lens is allowed to go away from the storage medium, and then, outputs another control signal along which the objective lens is allowed to be close to said storage medium, whereby said objective lens is braked.

* * * * *